United States Patent
Ahrens

(10) Patent No.: US 10,366,640 B2
(45) Date of Patent: *Jul. 30, 2019

(54) SKI-CHAIR-LIFT DISPLAY APPARATUS AND METHOD

(71) Applicant: Christian R. Ahrens, Salt Lake City, UT (US)

(72) Inventor: Christian R. Ahrens, Salt Lake City, UT (US)

( * ) Notice: Subject to any disclaimer, the term of this patent is extended or adjusted under 35 U.S.C. 154(b) by 239 days.

This patent is subject to a terminal disclaimer.

(21) Appl. No.: 15/404,422

(22) Filed: Jan. 12, 2017

(65) Prior Publication Data

US 2017/0193868 A1    Jul. 6, 2017

Related U.S. Application Data

(60) Division of application No. 14/629,163, filed on Feb. 23, 2015, now Pat. No. 9,555,507, which is a
(Continued)

(51) Int. Cl.
| | |
|---|---|
| *G09F 23/02* | (2006.01) |
| *B23P 19/00* | (2006.01) |
| *B61B 12/00* | (2006.01) |
| *G09F 3/16* | (2006.01) |
| *G09F 7/06* | (2006.01) |
| *G09F 7/18* | (2006.01) |
| *G09F 23/00* | (2006.01) |

(52) U.S. Cl.
CPC .............. *G09F 23/02* (2013.01); *B23P 19/00* (2013.01); *B61B 12/002* (2013.01); *G09F 3/16* (2013.01); *G09F 7/06* (2013.01); *G09F 7/18* (2013.01); *G09F 2007/1856* (2013.01); *G09F 2023/005* (2013.01); *Y02T 30/40* (2013.01); *Y10T 29/49815* (2015.01)

(58) Field of Classification Search
CPC ....... B61B 10/00; B61B 10/001; B61B 10/02; B61B 10/022; B61B 11/00; B61B 11/002; B61B 11/004; G09F 23/00; G09F 23/02; G09F 23/06; G09F 7/00; G09F 7/002; G09F 7/02; G09F 7/06; G09F 7/08; G09F 7/18
See application file for complete search history.

(56) References Cited

U.S. PATENT DOCUMENTS

| | | |
|---|---|---|
| 5,301,443 A | 4/1994 | Gori |
| 5,685,095 A | 11/1997 | DeMasi |
| (Continued) | | |

*Primary Examiner* — Robert J McCarry, Jr.
(74) *Attorney, Agent, or Firm* — Pate Baird, PLLC

(57) ABSTRACT

A display system is easily attached to the safety bar of a chair on a chair lift system at the beginning of a season. The display system includes brackets formed of rails holding clamp portions that may be fastened together to clamp the display system to a chair, such as to the safety bar across the lap of a rider. At the end of a season, the display system may be removed from each chair, the clamp portions removed, and the display systems stacked. In one simplified system, adjacent displays may be stacked back to back, and such adjacent pairs may be stacked with the displays in adjacent pairs positioned face-to-face. Thus, metal brackets on the backs need not scratch up the reading faces or surfaces. Meanwhile, the displays may be stored in minimal space, with great stability, while minimizing wear and damage.

20 Claims, 12 Drawing Sheets

Related U.S. Application Data continuation-in-part of application No. 13/766,400, filed on Feb. 13, 2013, now Pat. No. 8,960,101, which is a continuation of application No. 12/781,082, filed on May 17, 2010, now Pat. No. 8,387,542.

(56) References Cited

U.S. PATENT DOCUMENTS

| | | |
|---|---|---|
| 7,174,665 B2 | 2/2007 | Jay |
| D547,383 S | 7/2007 | Jay |
| 8,387,542 B2 | 3/2013 | Ahrens |
| 8,960,101 B2 | 2/2015 | Ahrens |
| 9,555,507 B2 * | 1/2017 | Ahrens ............... B23P 19/00 |
| 2006/0075934 A1 | 4/2006 | Ram |

* cited by examiner

SKI-CHAIR-LIFT DISPLAY APPARATUS AND METHOD

RELATED APPLICATIONS

This application: is a divisional of U.S. patent application Ser. No. 14/629,163, filed Feb. 23, 2015; which is a continuation in part of U.S. patent application Ser. No. 13/766,400, filed Feb. 13, 2013, issued Feb. 24, 2015 as U.S. Pat. No. 8,960,101; which is a continuation of U.S. patent application Ser. No. 12/781,082, filed May 17, 2010, issued Mar. 5, 2013 as U.S. Pat. No. 8,387,542; all of which are hereby incorporated by reference.

BACKGROUND

The Field of the Invention

This invention relates to ski lifts and in particular to informational displays available and presented to riders on a chair lift system.

The Background Art

Riders of ski chair lifts may spend considerable time riding a lift up a mountain side to the beginning of a particular run or series of runs, before skiing down one or more of those runs to the bottom to repeat the exercise. While skiing, a skier does exercise and may maintain body warmth by virtue of that exercise. However, considerable time is spent in a virtually stationary position in the chair. Moreover, considerable time is spent waiting in line at some resorts. Thus, considerable time is spent idle.

Typically, users may have only limited time to review area maps posted on signs about a ski resort. Instead, a user or rider of a ski lift may typically have a folded map in a pocket. Folded maps are necessarily problematic. Removing bulky gloves to unfold a map and fold it up again is not highly effective, and can be very uncomfortable.

For example, high above the surface of the earth, ski chair lifts may sometimes be dozens of feet high in the air. Thus, riders are exposed to wind and cold. Removing gloves and mittens while riding a chair life is hardly recommended due to the cold weather.

Riding a lift a user or rider is provided only limited opportunity for movement and thus is exposed to full force of the prevailing climate, which is typically cold to support the necessary environment for a ski resort. Comfort may be improved by keeping protective clothing in place.

Meanwhile, riders have a limited time upon completing a run to review a larger area map posted on signage at the resort. Moreover, a user must go back into a line to wait for the next chair. Thus, it would be an advance if a user of a ski resort, a rider, a skier, could have access to a map, already printed, mounted right on the lift chair that a particular user is riding.

BRIEF SUMMARY OF THE INVENTION

In accordance with the foregoing, an apparatus and method in accordance with the invention provide a system of displays or panels that may be divided into an information region, and an advertising region. Typically, the information region occupies the largest and central portion of a panel. Meanwhile, the panel may be mounted to a safety bar that drops down in front of the riders upon seating themselves on the lift chair.

A display system is easily attached to the safety bar of a chair on a chair lift system at the beginning of a season. The display system includes brackets formed of rails holding clamp portions that may be fastened together to clamp the display system to a chair, such as to the safety bar across the lap of a rider. At the end of a season, the display system may be removed from each chair, the clamp portions removed, and the display systems stacked. In one simplified system, adjacent displays may be stacked back to back, and such adjacent pairs may be stacked with the displays in adjacent pairs positioned face-to-face. Thus, metal brackets on the backs need not scratch up the reading faces or surfaces. Meanwhile, the displays may be stored in minimal space, with great stability, while minimizing wear and damage.

Thus, an apparatus in accordance with the invention may include a system of brackets to secure a spine to the safety bar, and a panel to the spine. The panel may include informational regions and advertising regions to inform users concerning the resort, as well as other commercially available benefits, such as lessons, ski equipment, food, other products, or sponsored events or products.

In certain embodiments, the visible panels may be subdivided physically as well as content-wise in order to be able to change out certain portions of a panel when that information become obsolete. Likewise, when sponsored information receives a new sponsor, it may require new information or sponsor information.

In certain embodiments, a bracket may be easily removed in order that the system may be stored out of the weather during off season times. In particular, a bracket system may include a rail that receives fingers or clamps into a slide path or a way along the rail. Thus, the brackets, or at least the clamps if not the rails, may be readily removed in order to stack the panels together. Removable clamps may both stabilize them as a stacked array of panels, as well as reducing thickness, thus occupying considerably less space.

Thus, the larger dimensions in a direction parallel to the horizontal plane of a panel occupies considerable space. It is a saving of space to remove the clamps from a rail, which together form the bracket system. Thereby, the panels may be laid face to face or back to back in alternating pairs. The rails may be slightly offset in order to minimize the amount of space occupied by a set of stored panels. In due course, the systems may be reassembled. The brackets may be reassembled by sliding the clamps into the rails. With the attachment of a few fasteners, the panels may be reinstalled on the safety bars of the lift chairs of a ski lift.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
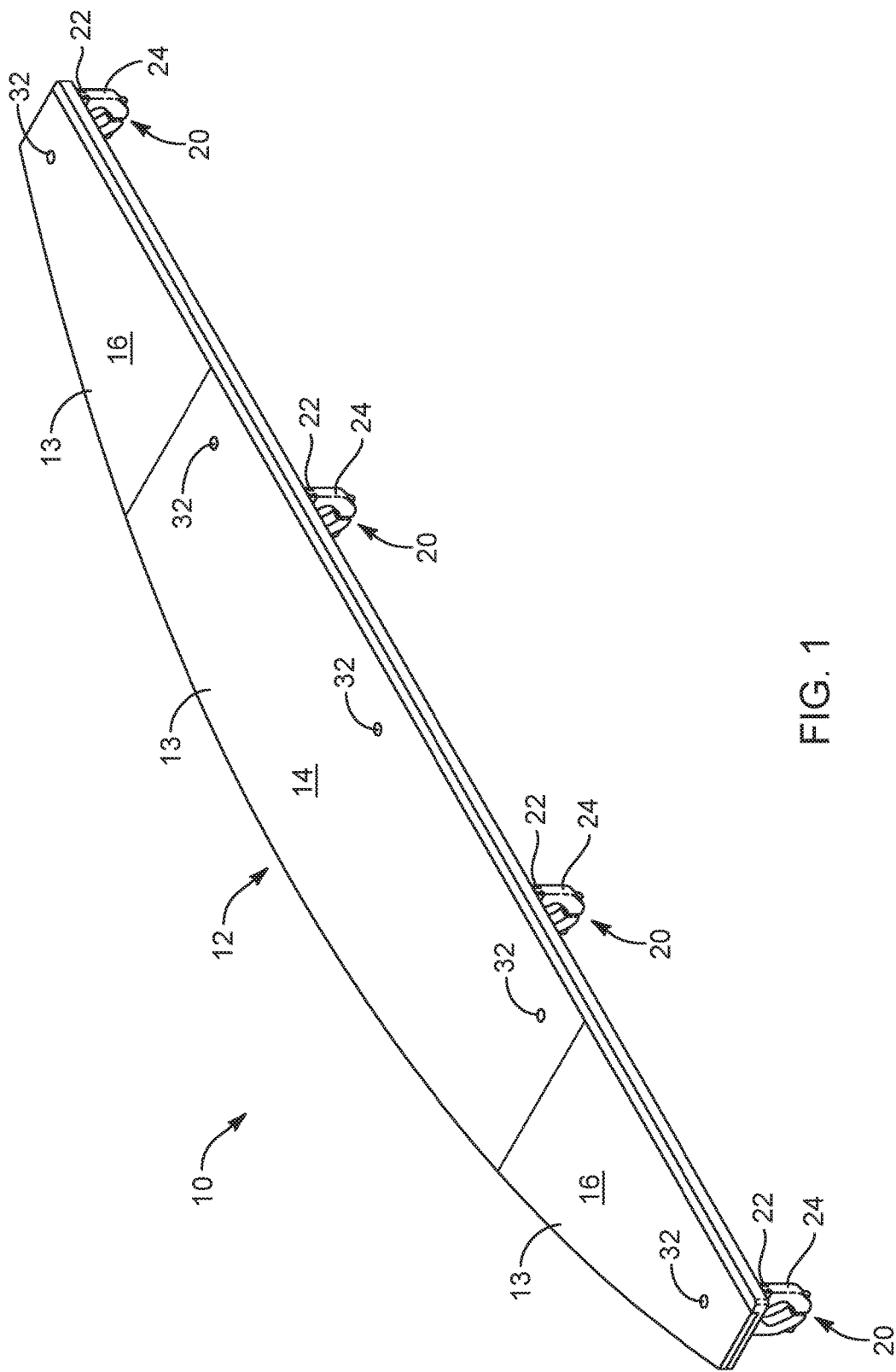
FIG. 1 is a top, rear quarter perspective view of one embodiment of the apparatus in accordance with the invention.
Figure 2:
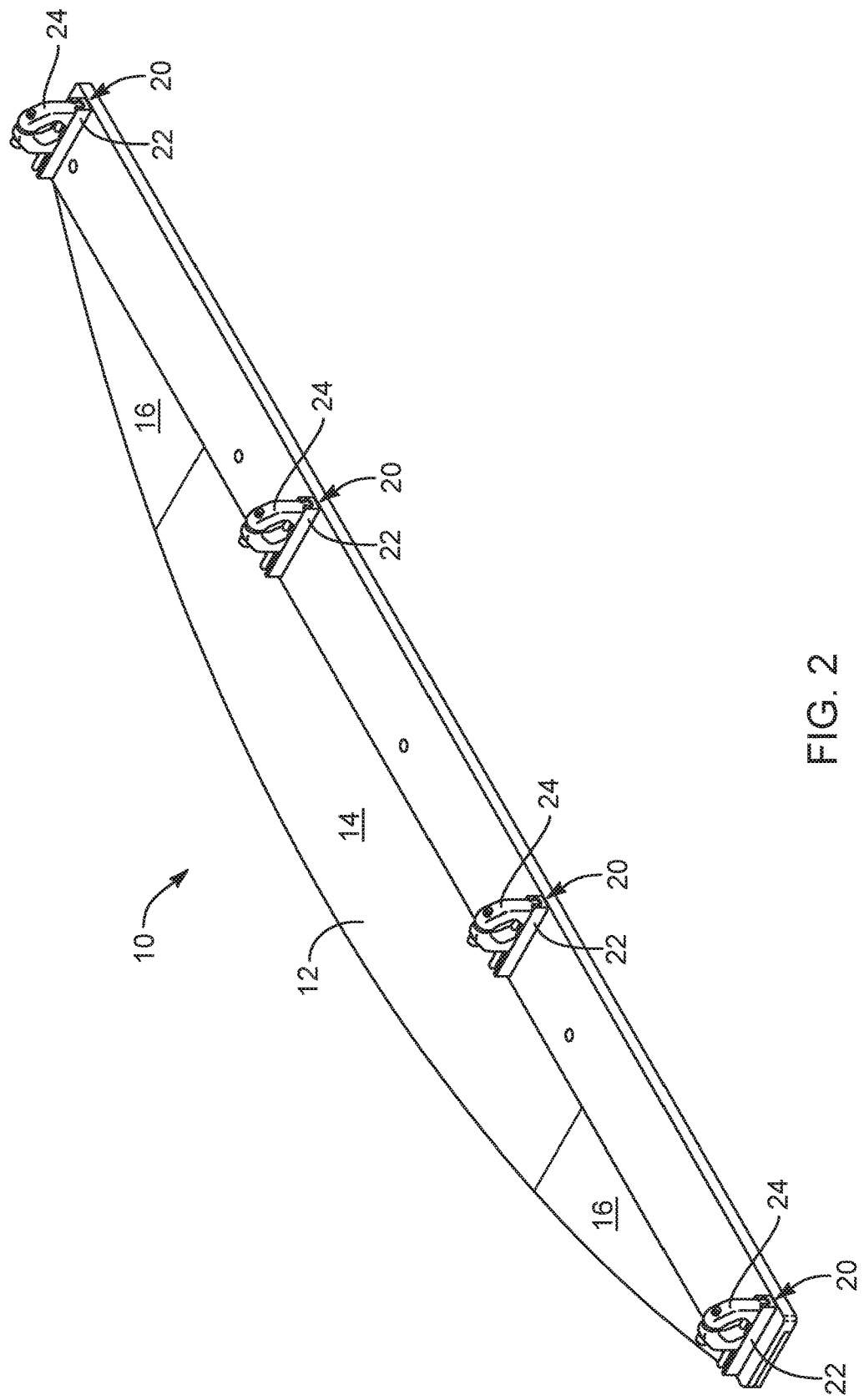
FIG. 2 is a bottom rear quarter, perspective view of the apparatus of FIG. 1.
Figure 3:
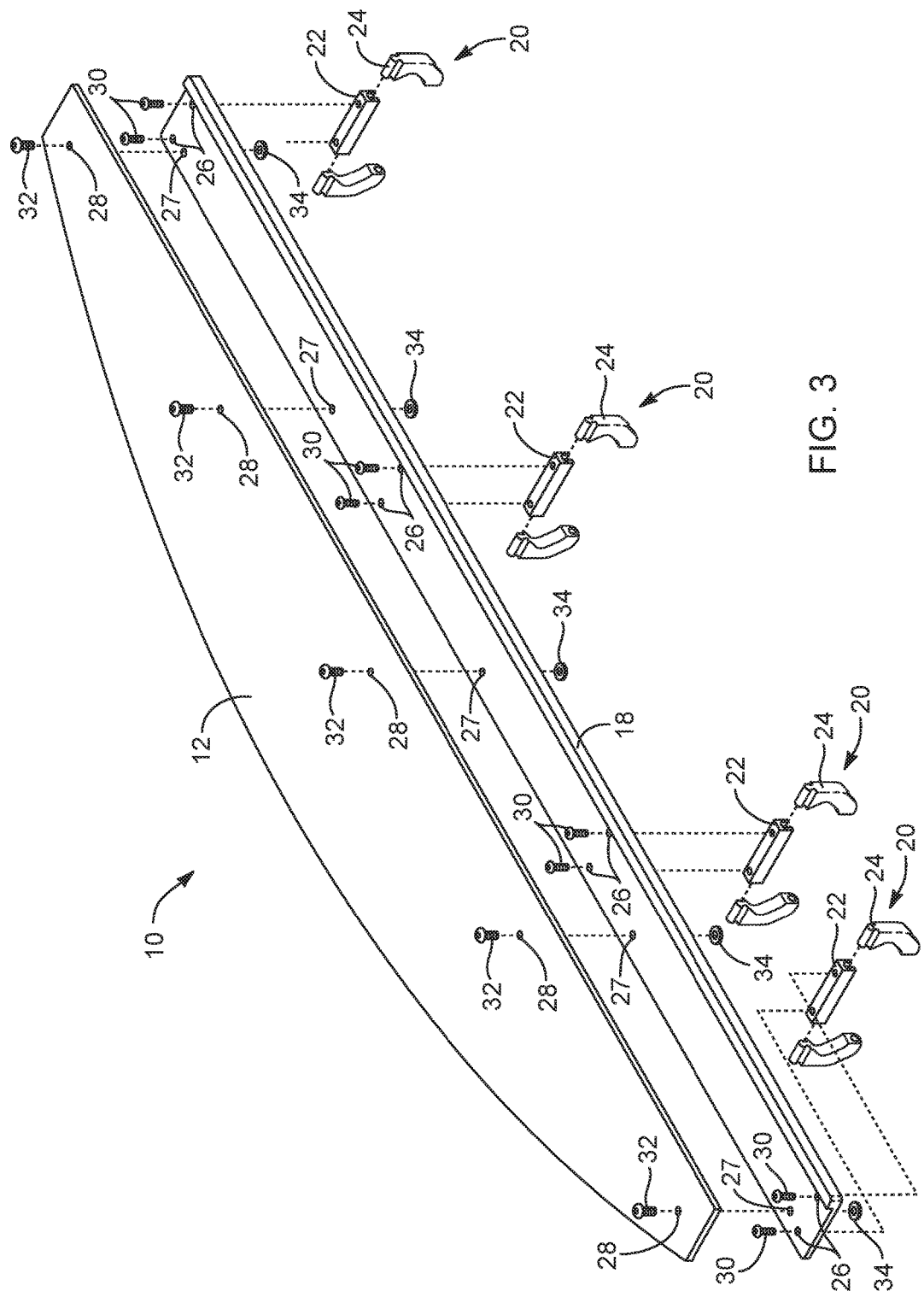
FIG. 3 is a perspective, exploded view of the apparatus of FIGS. 1-2.
Figure 4A:
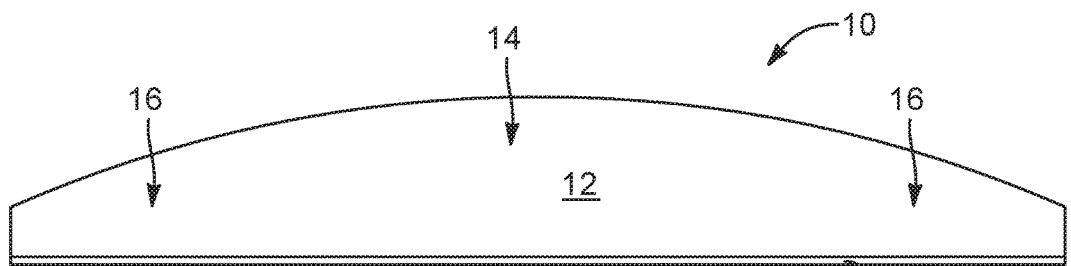
FIG. 4A is a top plan view of the apparatus of FIGS. 1-3.
Figure 4B:
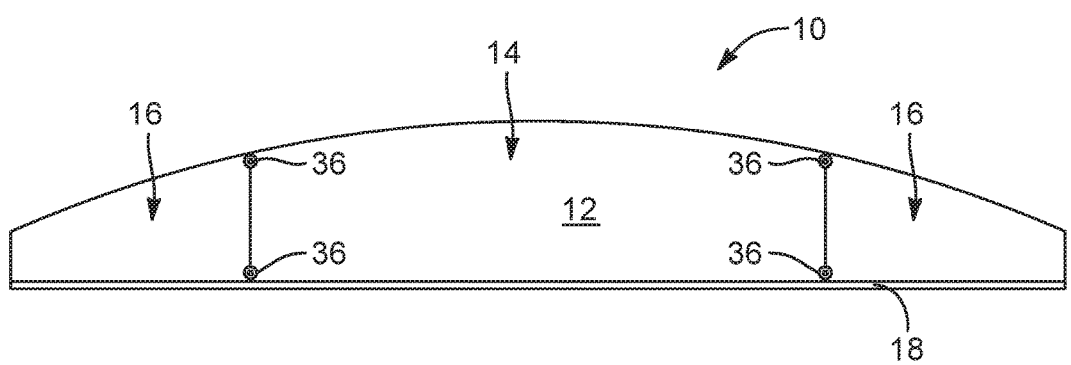
FIG. 4B is a top plan view of the one alternative embodiment of the apparatus of FIGS. 1-4A, having the panel portion subdivided into removable sub-portions.
Figure 5A:
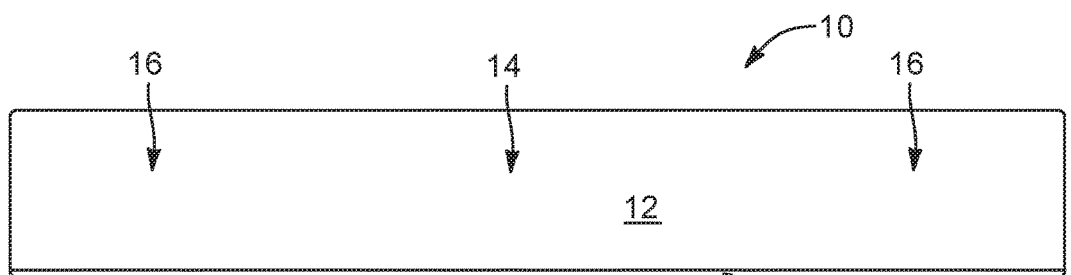
FIG. 5A is a top plan view of the apparatus of FIGS. 1-4, this one having a more rectangular shape for the main panel.
Figure 5B:
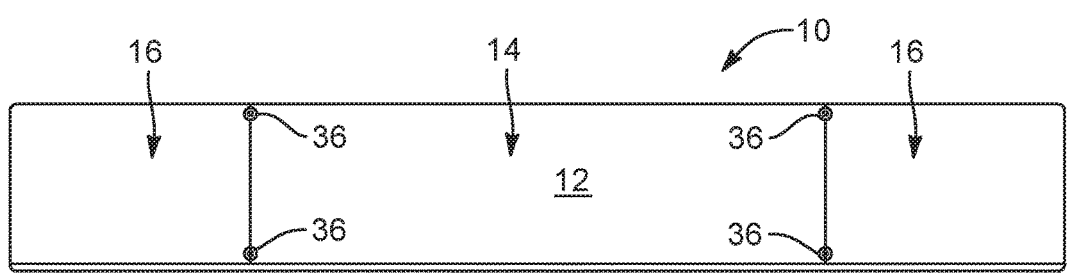
FIG. 5B is a top plan view of an alternative embodiment of the apparatus of FIG. 5A, this corresponding to FIGS. 1-5A, but providing for both rectangular shaping of the main panel area, and also separable or removable portions of the panel.
Figure 6A:
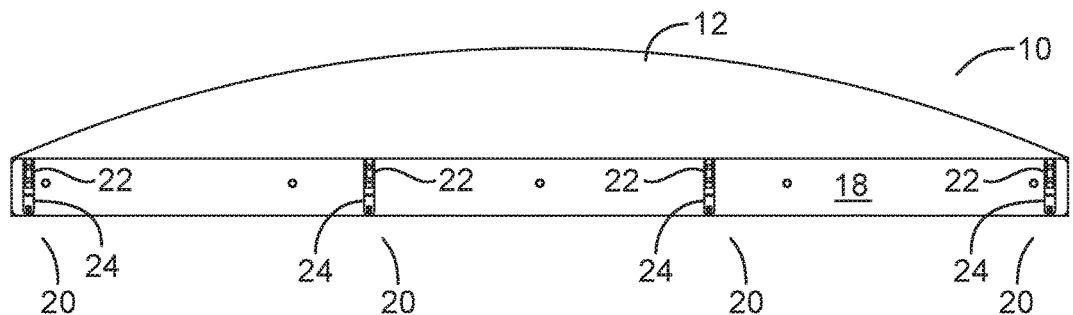
FIGS. 6A-6D are bottom plan views of the apparatus of FIGS. 4A, 4B, 5A, and 5B, respectively.
Figure 6B:
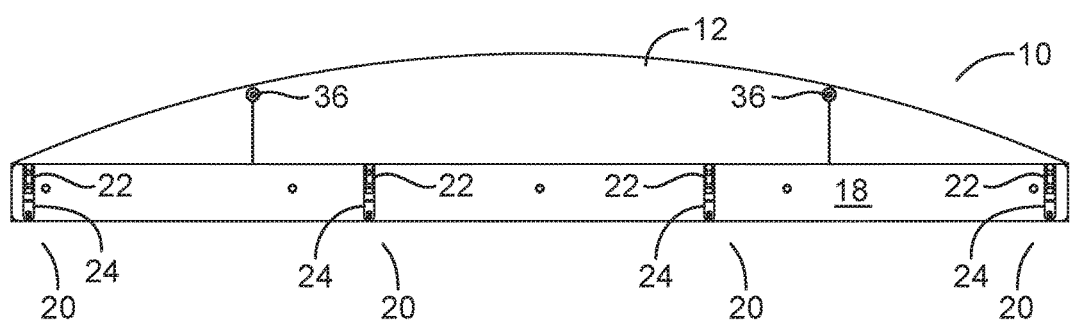
Figure 6C:
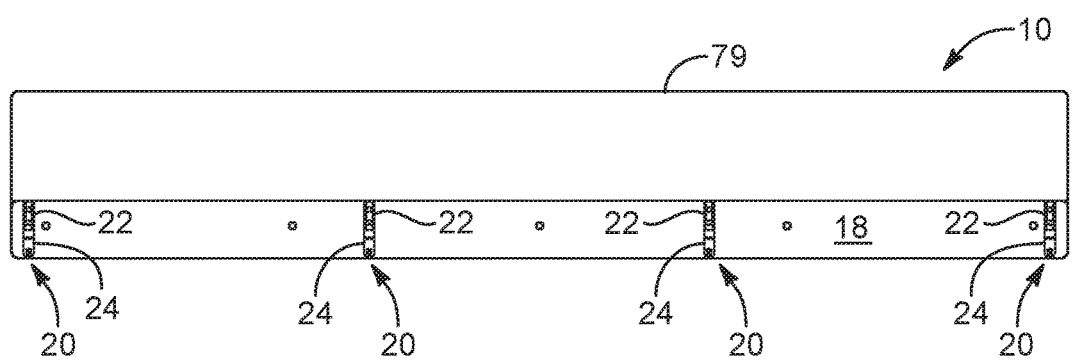
Figure 6D:
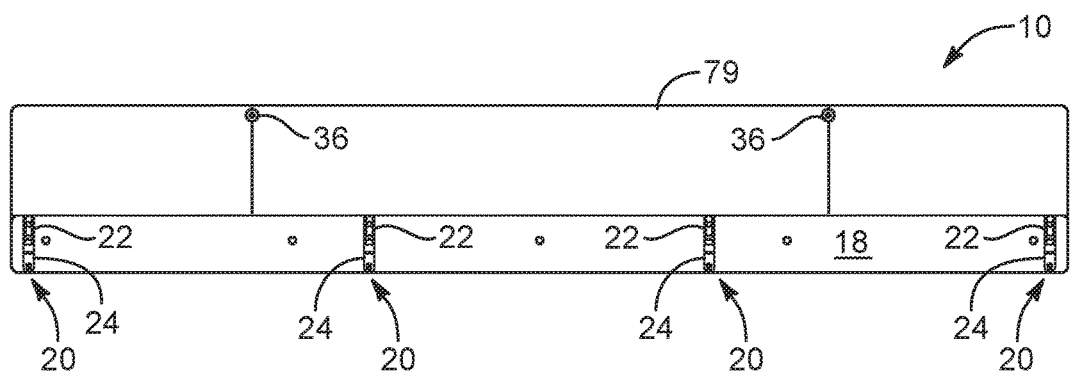
Figure 7:
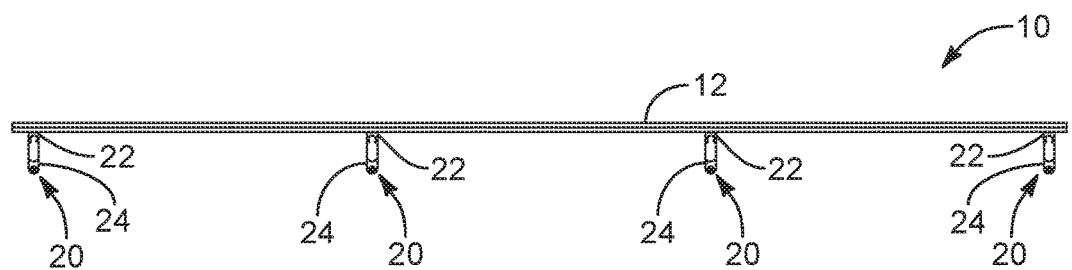
FIG. 7 is a front elevation view of the apparatus of FIGS. 4A and 5A.
Figure 8:
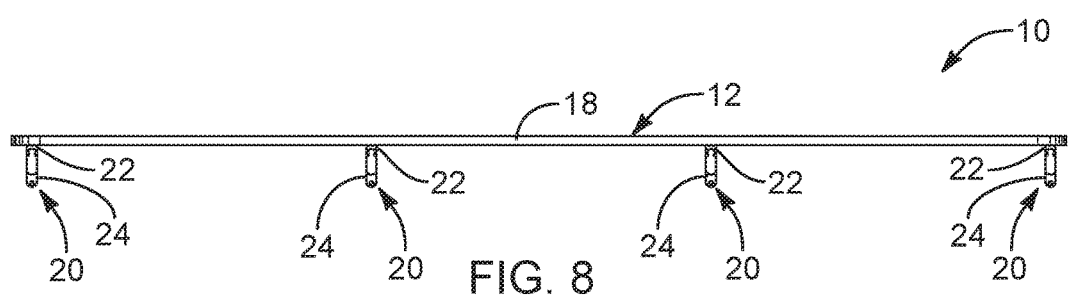
FIG. 8 is a rear elevation view of the apparatus of FIGS. 4 and 5.
Figure 9A:
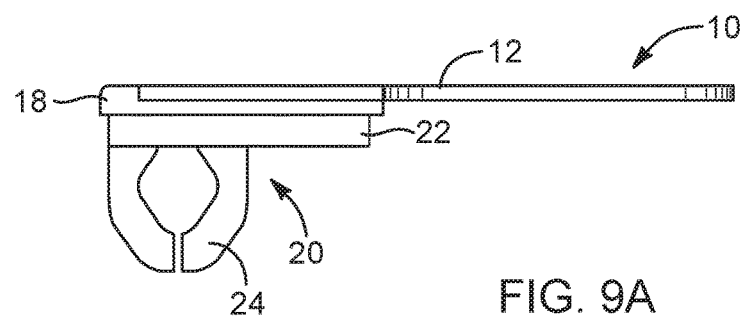
FIGS. 9A and 9B are right end elevation view of the apparatus of FIGS. 4 and 5, respectively.
Figure 9B:
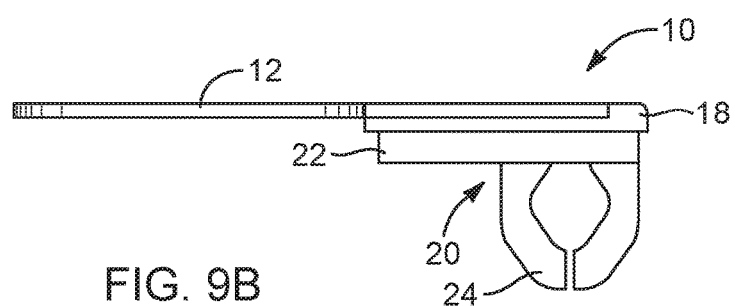
Figure 10A:
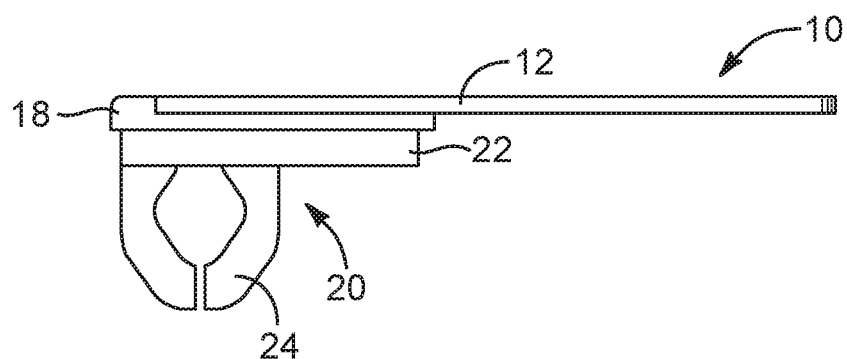
FIGS. 10A and 10B are left end elevation views of the apparatus of FIGS. 4 and 5, respectively.
Figure 10B:
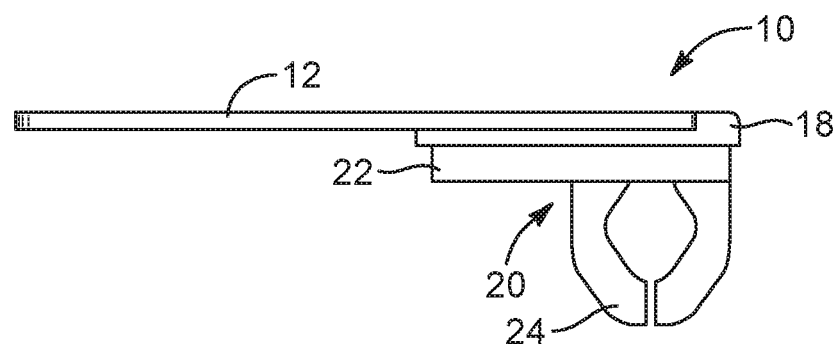

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIGS. 1-10, an apparatus 10 or system 10 in accordance with the invention may include a display 12 or a panel 12. The display 12 may be divided into regions 13 generally, including information regions 14 and advertising regions 16. Each information region 14 may be designated for display of particular information. For example, the advertising region 16 may be devoted to advertising information. Meanwhile, the central region 14 may be designated for other, non-commercial information.

In one embodiment in an apparatus and method in accordance with the invention, the information region 14 may contain a map of a ski area. The map may be available to multiple riders sitting on a chair lift. In the illustrated embodiment, a user may view the information region 14 in order to determine a desirable area in which to ski. By providing a map in the information region 14, a ski resort may thus improve traffic, better serve customers, and otherwise promote the satisfaction of users of the ski area.

In general, an apparatus 10 may be assembled as part of a ski lift chair. In certain embodiments, the apparatus 10 be considered to be both the display system 12 as well as the ski lift chair in its entirety. This may even include the towers. In other embodiments, the system 10 may include simply that portion thereof that will attach to a lift chair.

Nevertheless, in general, chair lift systems typically include towers provided with rollers across which a cable may pass. Chairs are suspended by hangers or columns from the cable. Typically an engine of some type will operate at one end of a loop formed of the cable, such as at the bottom or at the top of a ski run. The motor, driving a large sheave about which the cable passes in a closed loop, thus moves the cable along, drawing the lift chairs with the cable up the mountain and back down.

Typically, riders in a ski resort environment will ride the chair life from the bottom to the top. In some instances, maintenance personnel, safety personnel, and other staff may ride the chair lift down the mountain as well. In sight-seeing venues, riders may actually ride the lifts upward and downward on a regular basis.

An apparatus 10 or system 10 in accordance with the invention, may include a back bone 18 or spine 18 in addition to the display 12. In order to maintain the information region 14 and advertising region 16 readable, to minimize distortion, to avoid random reflections of light therefrom, a spine 18 may increase the stiffness thereof.

As an engineering principle, a section modulus is increased in order to stiffen a material or a structure. Section modulus is increased when material is moved, placed, or otherwise located as far as possible from the neutral axis. The neutral axis is the axis of zero stress and is typically near the center of a weighted cross-sectional area, as defined by engineering principles of radius of gyration of a cross section, and so forth. Thus, in one embodiment of an apparatus and method in accordance with the invention, a spine 18 may be formed to secure, fasten, bond, or otherwise attach or may be formed directly or integrally with the display 12 in order to provide increased stiffness thereof. The cross section may be rectangular, a box, a 'T,' and 'L,' a channel, or the like.

Stiffening the display 12 permits the maintenance of the desired shape. For example, in one embodiment, the display 12 may be substantially flat. In such an embodiment, any variation away from flatness tends to increase the chance of random reflections of light at multiple angles. Such random curvature may greatly interfere with the visibility or readability of materials due to random reflections of light making difficult the viewing of the display 12 from a single, selected angle chosen by a user.

The display 12 may be secured to a safety rail or safety bar of a chair lift by brackets 20. Various embodiments of brackets 20 are contemplated in an apparatus 10 in accordance with the invention. Nevertheless, in one presently contemplated embodiment that has demonstrated many useful and valuable features, a bracket 20 may include a rail 22 or rail portion 22 and correspondingly fitted clamps 24. In certain embodiments, the rail 22 may be formed with a portion of a clamp 24 as a homogeneously formed part thereof. In other embodiments, the clamps 24 may be completely separable from the rail 22, and may be formed separately in a manufacturing process.

One advantage of a rail 22 having no clamps 24 integrally formed therewith is that the rail 22 may then be machined by a faster process, may be extruded, or may be otherwise manufactured in a simpler process. By contrast, inclusion of at least a portion of a clamp 24 as part of a rail 22 may involve more complex forming, molding, and the difficulties of release from such a mold.

The rail 22 and clamps 24 may be made of the same or different materials. Similarly, the rail 22 and clamps 24 may be provided in sizes and numbers to provide adequate securement by the brackets 20 of the display 12 to a chair apparatus of a chair lift.

In the illustrated embodiment, the clamps 24 may include apertures 25. The apertures 25 may be formed, for example, into or through a portion of each rail 22. Apertures 25 may thus receive fasteners.

In one embodiment, apertures 26 may also be formed in the spine 18. The apertures 27 may receive securement mechanisms passing through the spine 18, and into the apertures 25 of the brackets 20. For example, the apertures 25 may be threaded to receive a machine screw. In this way, a counter-bore on the apertures 26 of the spine 18 may receive the head of a button-head, internal hex, or other machine screw. Thus, the spine 18 may present a substantially completely flat surface for receiving the display 12 secured thereto without projections extending therefrom.

In one embodiment of an apparatus and method in accordance with the invention, the apertures 26 in the spine 18 for receiving the fastening mechanisms of the brackets 20 may be clear holes, having no threads therein. Likewise, at another location or several other locations, apertures 25 in the spine may be formed in order to secure the spine 18 to the panel 12 or display 12. In such an embodiment, the apertures 28 in the panel 12 may receive the same fasteners that pass through the apertures 27 in the spine in order to secure together the spine 18 and the display 12. Thus, the spine 18 and display 12 or panel 12 may form an assembly, which assembly may be assembled after the rails 22 have been assembled with the spine 18. In this way, the apertures 26 of spine 18 be occluded or hidden, typically, under the display 12. The display 12 may typically be formed of a clear durable material having information printed, embossed, painted, laminated, or otherwise fixed on the underside thereof and thus protected from weather.

As a practical matter, the apertures 25 in the rails 22 and brackets 20 may be aligned with both the apertures 26 and the apertures 27. In other words, the apertures 26 may be formed and placed to be identical to the apertures 27, in order to assemble the brackets 20, the spine 18, and the display 12 with a single set of fasteners through a single set of apertures 26, 27. Nevertheless, manufacturing processes are sometimes best adapted to provide for sequential rather than simultaneous securement of several mechanisms to one another as described above.

For example, fasteners 30 pass through the spine 18 in the illustrated embodiment in order to secure the spine 18 to the brackets 20. As illustrated here each of the fasteners 30 passes through the aperture 26 in the spine 18, and is threaded into an aperture 25 in a rail 22 of a bracket 20. In contrast, each fastener 32 passes through a panel 12 and the apertures 28 therein, also passing through apertures 27 in the spine 18. Typically, the fasteners 30 are threaded into the apertures 25 in the rails 22. However, the fasteners 32 are typically formed to include both a screw or bolt portion and a nut portion in order to clamp the display 12 and the backbone 18 or spine 18 together therebetween. Nevertheless, in certain embodiments, the fasteners 30 and 32 may be combined to use a single fastener 30 that passes through the display 12, through the spine 18, by way of apertures 28 in the panel 12, the apertures 27 in the spine, which act in dual purpose as the apertures 26 as well. Thus, the fastener 30 ultimately threads into the apertures 25 in the rails 22 of the brackets 20.

In general, a fastener 32 may be configured as a machine screw, having a counter sunk head, a cap head, or the like. Meanwhile, a nut 34 or keeper 34 may secure to the fastener 32 and tighten along the fastener 32 in order to clamp the display 12 or panel 12 securely against the spine 18 or backbone 18. Nevertheless, in certain embodiments, the fasteners 32 may include rivets. In such an event, a keeper 34 may often be simply a washer to be held in place by the swelling of the rivet and opposite the head thereof. Meanwhile, other types of fasteners 32 may be used separately, or in combination with other fasteners described herein.

In certain embodiments of apparatus and methods in accordance with the invention, additional fasteners 36 may facilitate a selective separation and engagement of display 12 in which the information region 14 at the center of the display 12 is actually a physically separate piece from the advertising regions 16. For example, in the example of a ski resort, a map of a ski resort is not likely to change repeatedly or frequently in a season or often over several years.

By contrast, advertisers may contract for a single season. Accordingly, the advertising regions 16 may benefit from being replaced by new advertising regions every season, or perhaps within a season. Accordingly, it may be beneficial to make the panel 12 or display 12 in such a way that the advertising regions 16 are removable and replaceable. In order to provide this interchangeability at disparate times between the information region 14 and the advertising regions 16, fasteners 36 may be developed and installed to provide alignment in all three dimensions, or less, between the regions 14 and the regions 16.

For example, in certain embodiments, alignment of straight edges may be sufficient to secure the alignment of the information region 14 and the advertisement region 16 against rotation or translation in any direction that may cross the line of demarcation therebetween. Nevertheless, if those edges are both flat, then they may slide vertically with respect to one another.

For example, in the plane of the display 12, a certain amount of misalignment may occur in a direction along the line of interface between the information region 14 and the advertisement regions 16. Similarly, alignment perpendicular to the plane of the display 12 may be slightly problematic, absent some mechanism to maintain alignment.

The fasteners 36 may provide one manner in which a bolt, with or without large washers, a clip, a clamp, or the like may be provided as fasteners 36 to enforce alignment. Likewise, a cross section may be made along the interface between the information region 14 and the advertisement region 16 in order to secure alignment in a direction perpendicular to the plane of the panel 12.

Figure 11:
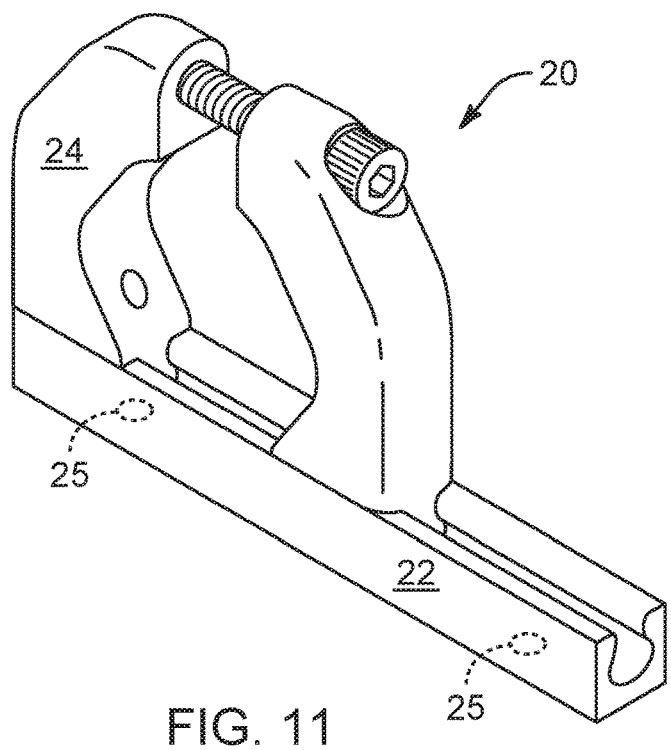
FIG. 11 is a perspective view of one embodiment of a bracket in accordance with the invention, comprising a rail on which two independent clamps may slide toward one another to be secured to one another, clamping a safety bar from a lift chair therebetween.
Figure 12:
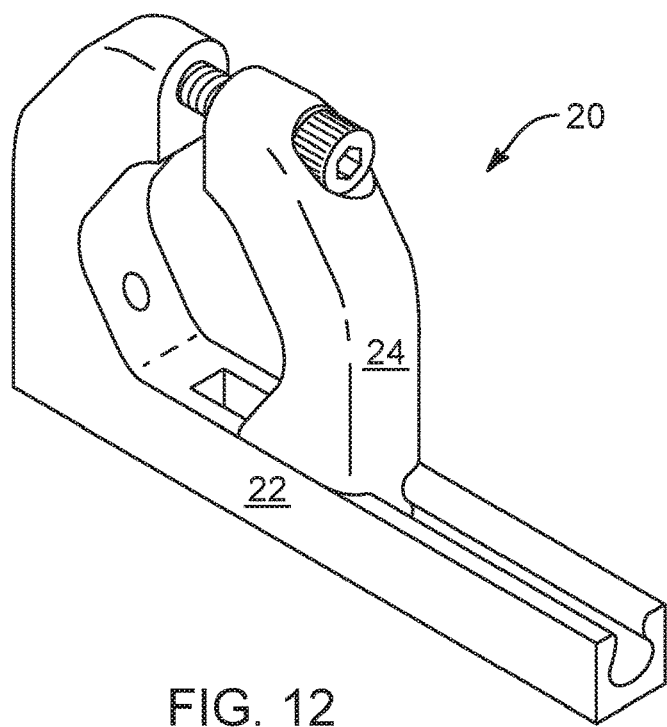
FIG. 12 is a perspective view of an alternative embodiment of a bracket for use in the apparatus of FIGS. 1-10, this particular bracket having an integrally, even homogeneously, formed clamp formed with the rail, and a second freely sliding clamp engaging the rail.
Figure 13:
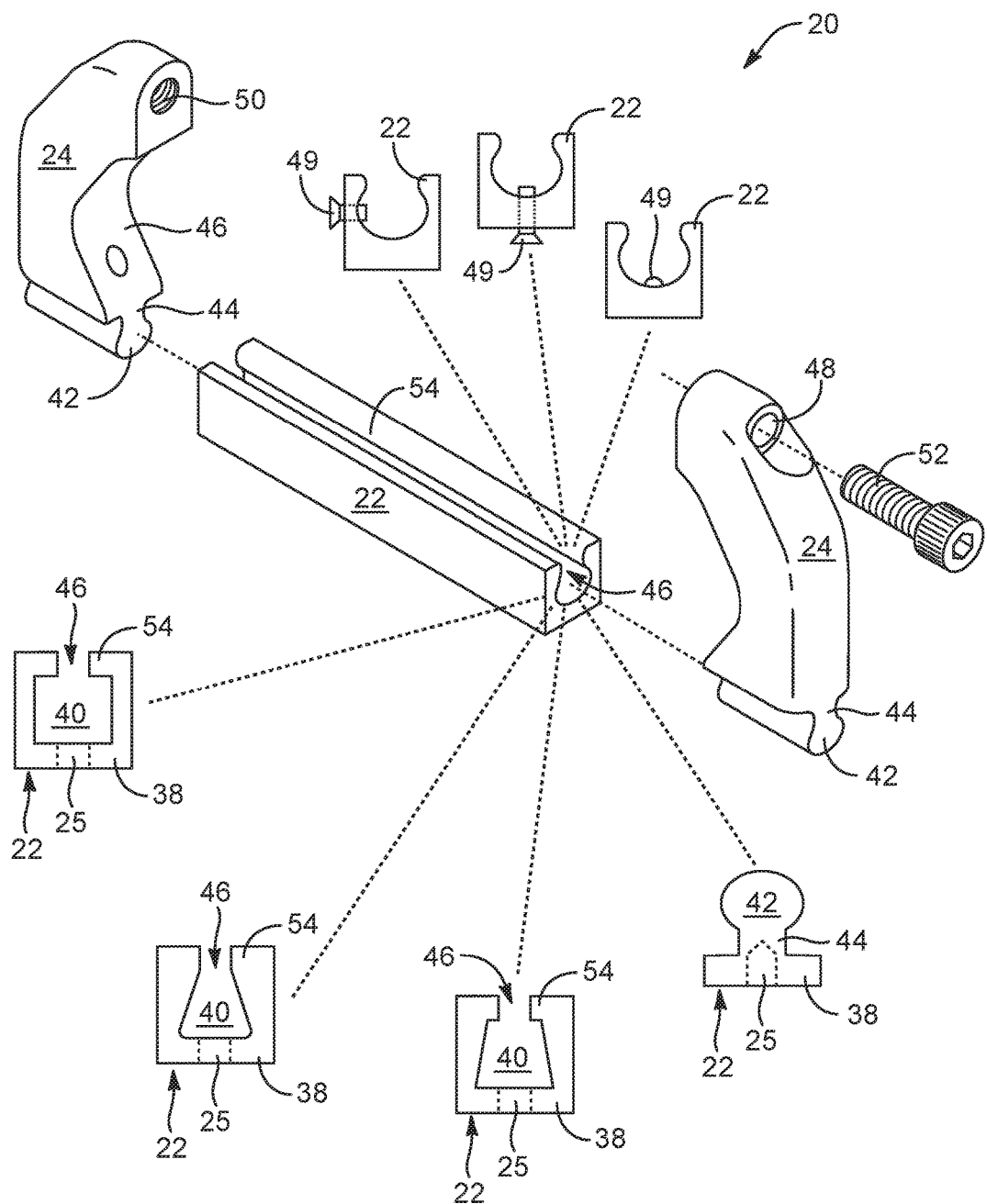
FIG. 13 is a perspective, exploded view of the bracket assembly of the apparatus of FIGS. 1-10, and specifically the embodiment of FIG. 11, also showing alternative embodiments of the cross section of the rail.

Referring to FIGS. 11-13, while continuing to refer generally to FIGS. 1-15, an apparatus 10 in accordance with the invention may rely on a bracket 20 comprising a rail 22 supporting a clamp 24. In certain embodiments, one of the clamps 24 may actually be formed into the rail 22. In other embodiments, the rail 22 may be of a constant cross sectional area and shape, receiving therein two clamps 24. One benefit to the latter configuration is that the apparatus 10 may be stowed during the off-season more readily.

For example, in the embodiment of FIG. 11, the clamps 24 may be removed from the rails 22. The resulting additional thickness of a rail 22 added to the spine 18 and the panel 12 is about an inch or less. If the rail 22 is formed with one of the brackets 24 as a monolithic and homogenous extension thereof, then the total thickness may be something closer to 3 inches. Moreover, the shape of a clamp 24 may render a stack of panels 12 quite unstable.

In contrast, the uniform dimension and the straight line or plane represented by the externally exposed surface of each of the rails 22 will tend to provide a stabilizing influence. For example, the apparatus 10 may be stowed with the clamps 24 completely removed from the rails 22. In this way, the various instances of the apparatus 10 may be placed alternating face-to-face together, and then back-to-back together in alternating pairs throughout a stack. Each of the rails 22 may be offset compared to the adjacent rails 22 of the next display 12 in order. In this way, even the ribs or spine 18 may be offset in stacking. Thus, two of the apparatus 10 may be placed with rails facing, but offset, in such a way that the entire thickness of a stacked pair is only increased by $\frac{1}{8}$th inch. This may provide almost double the number panels 12 stacked up in a given space. Storage and stowing are operational and space considerations.

The exploded view of FIG. 13 illustrates one manner in which a rail 22 may be configured, to have a base portion 38 into which the aperture 25 will be formed, such as by drilling. Meanwhile, along the length of the rail 22, the cross sectional configuration provides a way 40. A foot 42 or foot portion 42 of a clamp 24 may be set away from the main body of the clamp by a stem 44. In certain embodiments, the material of the clamp 24, including the stem 44 and its attached foot 42 may be forged, machined, cast, molded, or otherwise manufactured by a suitable method.

The foot 42 slides into and along the rail 22 in the way 40. The way 40 may connect directly to a slot 46 formed in the top wall 54 of the rail 22. Accordingly, the way 40 may be provided with a detent. The detent may be one of the fasteners 30 formed and sized to extend slightly into the way 40. For example, at an appropriate point, one of the fasteners 30 may extend into the aperture 25, and out into the way 40. If such a location is artfully chosen, then the feet 42 of two opposing clamps 24 riding in that way may effectively bracket the detent (such as a fastener 30) in order to maintain their own position. An aperture 48 may be a completely clean aperture 48 lacking any threads. Meanwhile, a corresponding aperture 50 may be threaded into the corresponding opposite bracket clamp 24. In certain embodiments, a fastener 52, such as a machine screw or the like, may pass through the clear aperture 48 and thread into a threaded aperture 50. Thus, the two opposing clamps sliding in the rail 22 may be drawn together.

If a detent 49 is provided, it may be a set screw in the side of a rail 22, a welded or other button limiting movement, a fastener 30 may extend through the threaded aperture 25 and into the way 40, to fit between the feet 42 of the two opposing clamps 24. The fastener 52 may secure the two clamps 24 together. The detent 49 extending into the way 40 registers the two clamps 24 at fixed position along the rail 22. In this way, the two clamps 24 may be registered at a position along the way 40 by the detent 49. They are restrained to remain with the rail 22 by the top wall 54 wrapped around each of the feet 42 to secure it within the way 40.

Referring to FIG. 13, the way 40 may be formed to have any particularly useful cross section. For example, the base 38 may be made of a suitable thickness in order to provide sufficient purchase for a fastener 30 threaded into the aperture 25. Meanwhile, the shape of the way 40 may provide for registration, clamping, easy sliding, or the like according to its shape. Some shapes contemplated may include a rectangle, a triangle, a trapezoid, a circle, or other suitable cross section.

In the event that one of the clamps 24 is integrally or homogeneously formed with the rail 22, manufacturing costs will probably be comparably higher. If instead, the rail 22 is an extruded part, then substantially large lengths, even continuous lengths, of the rail 22 material may be extruded, and cut to length at a later time. Thus, the costs and manufacturing difficulty made be simplified by using a continuous rail 22 of a constant cross section.

Nevertheless, if a clamp 24 is formed integrally or homogeneously with a rail 22, then that fixed clamp 24 may set the registration point against which the opposing clamp 24 will be drawn by a fastener 52.

Figure 14:
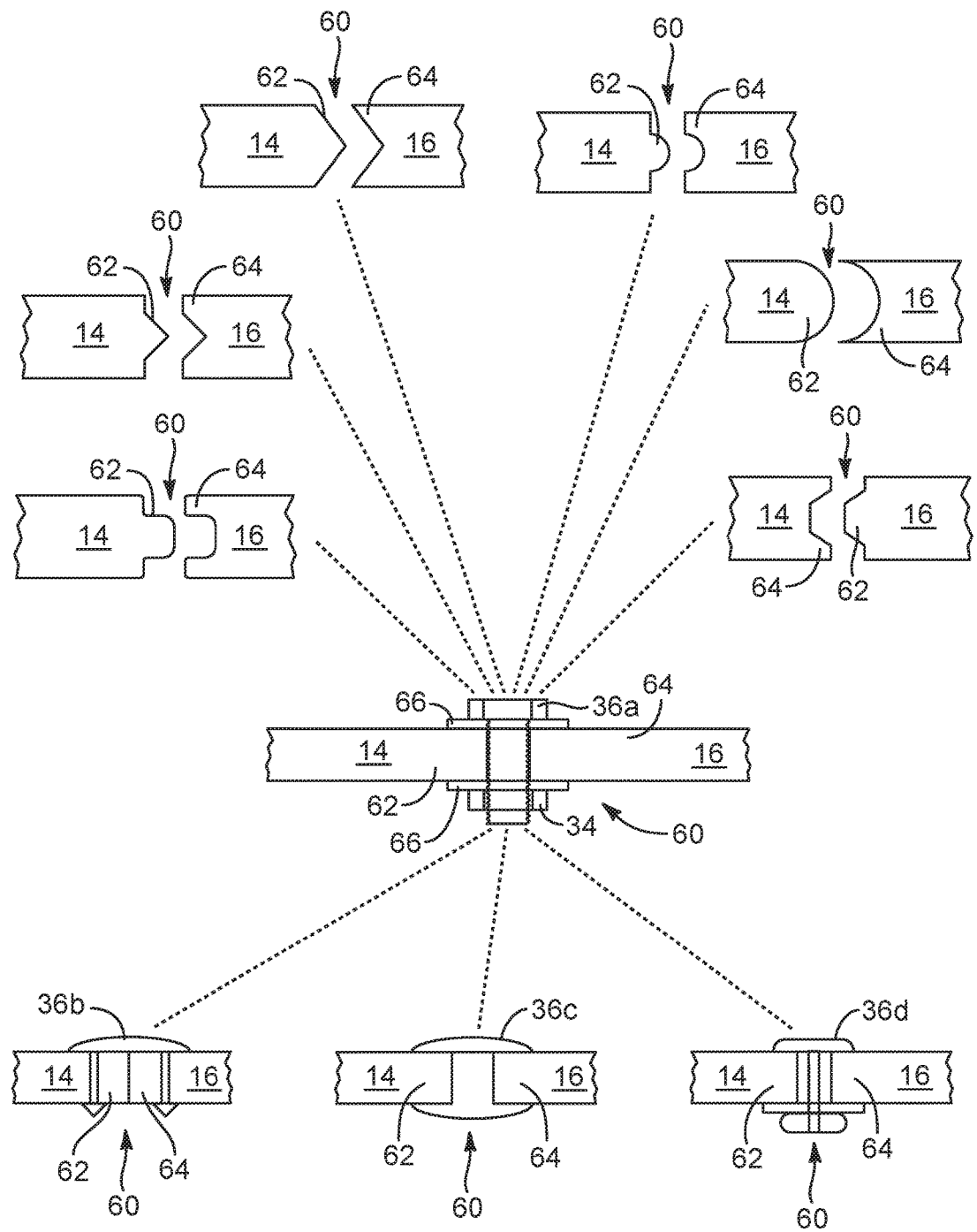
FIG. 14 is a partially cut away view of the joint region, for the apparatus of FIGS. 1-10, and in particular, illustrates alternative mechanism for implementing an embodiment of FIGS. 1-10 and in particular the embodiment of FIGS. 4B and 5B wherein the panel is subdivided into different physical portions that are selectively attachable and removable in accordance with the invention.

Referring to FIG. 14, while continuing to refer generally to FIGS. 1-15, a joint 60 may be formed at the interface between an information region 14 and an advertising region 16 of a display 12 or panel 12. In the illustrated embodiment, various forms of registration elements 62, 64 provide registration against the possibility of misalignment and surface roughness in a direction perpendicular to the plane of the display 12 or panel 12.

For example, a male registration element 62 may be formed to be a simple corner, a corner extending out from a flat surface, a semicircle extending out from a flat surface, a semicircle, a trapezoid, a trapezoid extending out from a flat surface, or even a simple, flat, abutting joint 60. Likewise, other shapes, such as a rectangular cross section having rounded edges for ease of installation may form the registration elements 62, 64.

In practice, the advertising region 16 may be provided with a detent, such as a ridge, boss, or the like extending slightly above the surface of the male registration element 62. Similarity, a slight undercut for the corresponding mating registration element 64 may also include a detent, or simply grip the detent provided on the opposite piece. In this way, the advertising region 16 may actually snap to the information region 14, or visa versa. Nevertheless, in certain embodiments, a pair of washers 66 or other fasteners may align the surfaces of the advertising region 16 and the information region 14.

In the illustrated embodiment, one or more washers 66, may be placed against the adjoining information region 14 and advertising region 16 about an aperture formed to receive a fastener 36a. The fastener 36a may thus pass through the aperture formed at the joint 60 in order to admit the fastener 36 and its keeper 34, such as a nut. Accordingly, the washers 66 may be compressed together by the fastener 36 and its associated keeper 34 in order to maintain alignment in a direction perpendicular to the horizontal plane of the display 12. Alternative embodiments of fasteners 36 are illustrated as a bolt 36a, a clip 36b, a rivet or plastic snap connector 36c, a pop rivet 36d, or the like. Each may fasten, contain, or both, the two regions 14, 16 in alignment.

Other embodiments may rely on extensions of the spine 18 extending forward to the front edge of the panel 12 in order to maintain the alignment between adjacent regions 14, 16 at their shared joint. The spine, for example, may extend coincident with the panel 12 in its entirety. The spine 18, in such an embodiment, may be perforated with weight reduction apertures removing material in circles or other shapes in order to maintain maximum section modulus at minimum weight. Runners may extend the spine forward along the joint shared between two regions 14, 16. A narrow H-Beam may receive each region 14, 16 at the joint.

Figure 15:
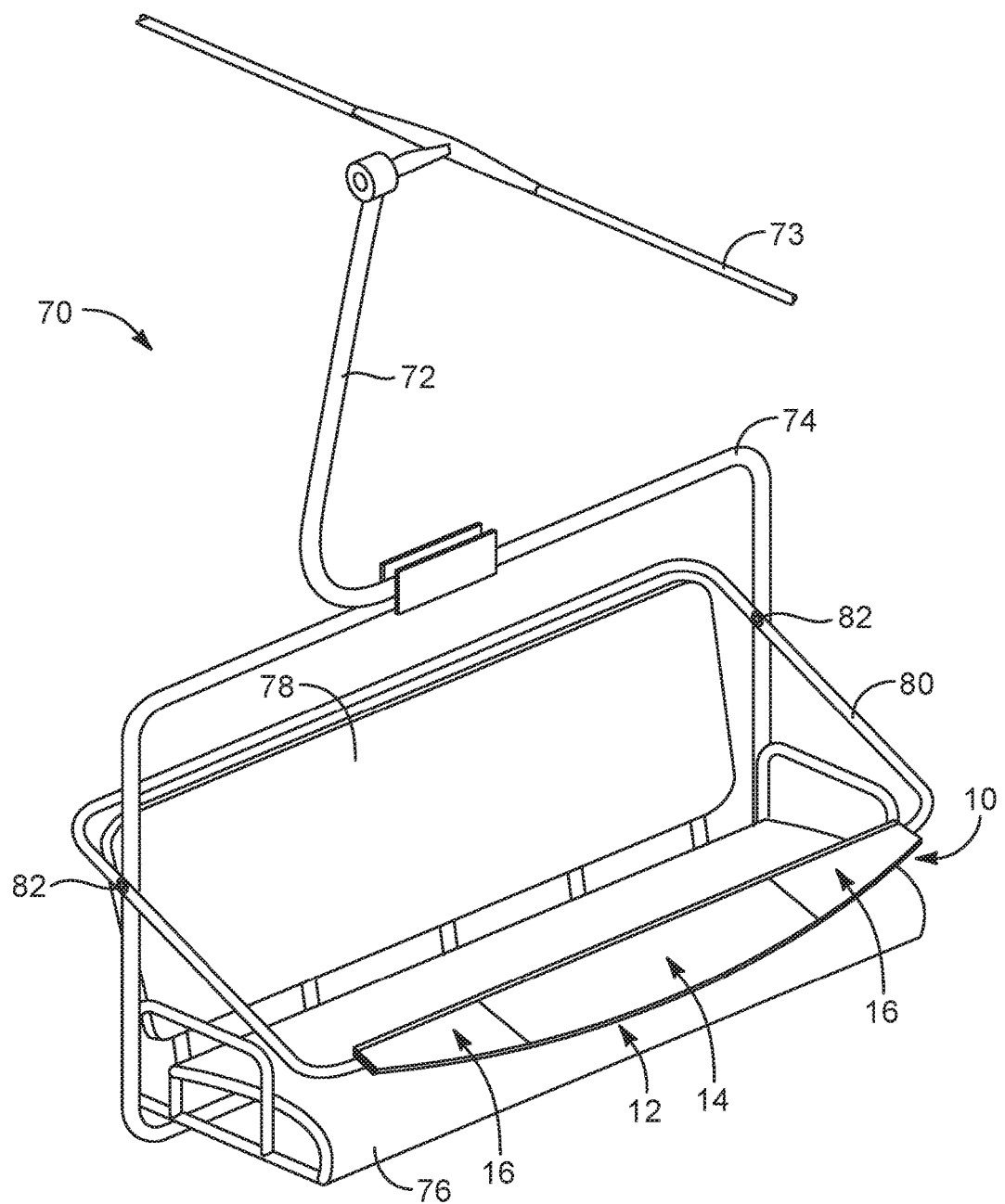
FIG. 15 is a perspective view of one embodiment of an apparatus in accordance with the invention, this embodiment including both the chair of a chair lift and its associated panel assembly in accordance with the invention.
Figure 16:
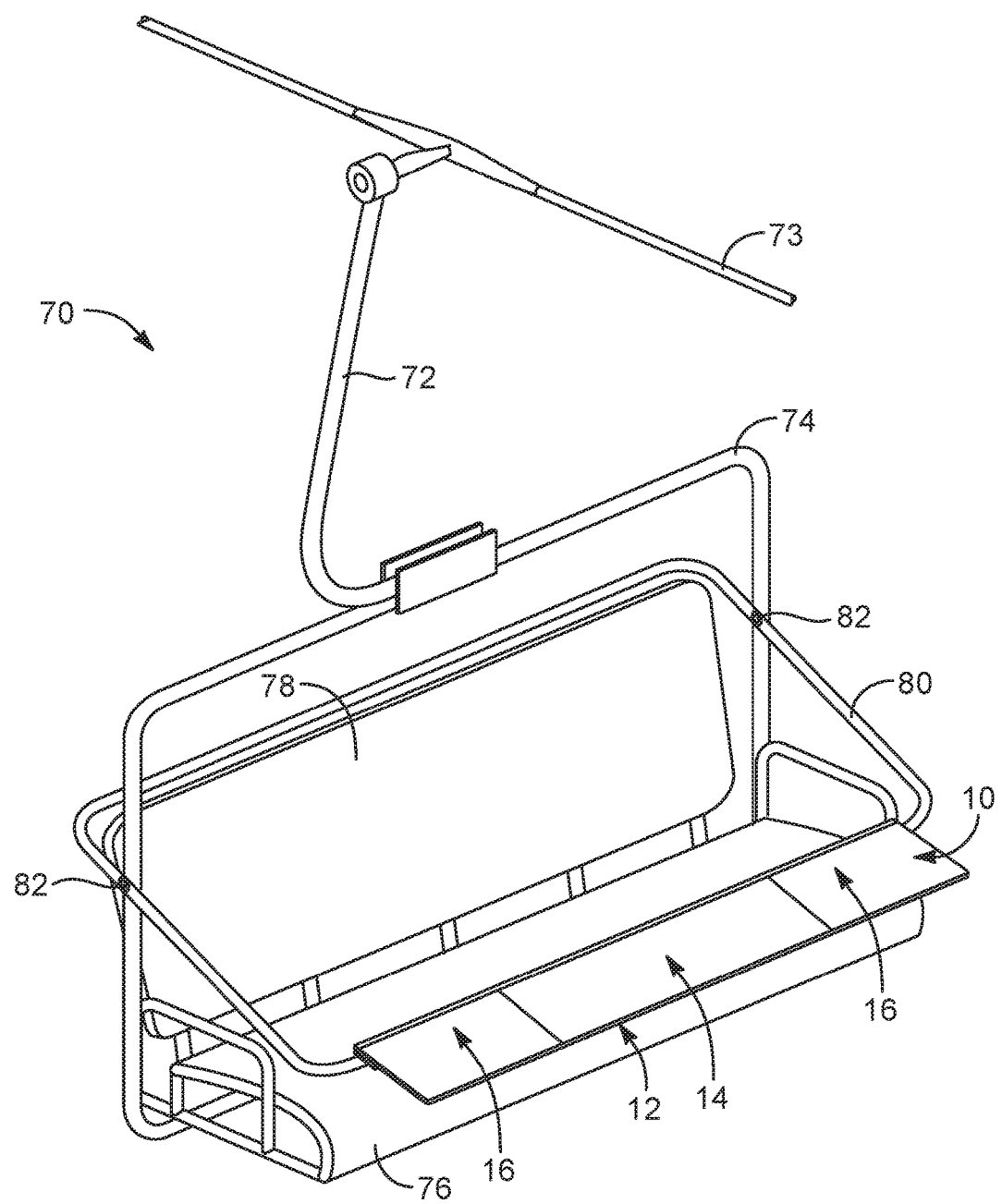
FIG. 16 is a perspective view of an alternative embodiment thereof, using a rectangular panel assembly.

Referring to FIG. 15, while continuing to refer generally to FIGS. 1-15, a chair 70 or a lift chair 70 may be suspended by a hanger 72 extending from a supporting cable 73 and extending down to support a yoke 74. Typically, in order to accommodate riders loading, and standing on skis at the loading position, the front of a chair 70 must be completely clear. Thus, a rider standing in front of the chair 70 as the chair is brought around and behind the rider will strike close to the knees (back of the knees) of a rider. Thereupon, the rider sits down as the chair 70 sweeps forward.

Accordingly, the yoke 74 maintains the front of the chair 70 completely clear. Thus, no obstruction is present in front of the seat 76 nor in front of the back 78, at least where the riders will be. Thus, the seat 76 and the seat back 78 will be clear.

However, having riders traveling by cable 73 many feet in the air above the surface of the mountain, can be dangerous. In order to keep riders in their seats, and protect against falls, a safety bar 80 may be configured, outwards, to pivot up or otherwise out of the way prior to riders seating themselves on the seat 76 of chair 70. Upon sitting down on the seat 76, and leaning against the back 78, a rider may draw down on, or an attendant at the ski area may actuate, the safety bar. Thus the safety bar 80 may be dropped down, at the front, about a pivot 82.

The safety bar 80 may be formed of a tubular material. Accordingly, each of the clamps 24 may be shaped to have a somewhat 'V-shaped' interior surface. Thus, the clamps 24 may be drawn together to secure the bracket 20 against a safety bar 80, typically accommodating diameters of from about one inch to about 2 inches. Most safety bars 80 are circular in cross section, having a diameter of from about 1 to about 2 inches. Most have a one inch diameter, and others, common to the industry, typically have a diameter of up to one and three quarters inches. Thus, an apparatus 10 in accordance with the invention may be thought of as the assembly 10 attached to the chair 70, and particularly to the safety bar 80. Alternatively, one may think of the apparatus 10 as including both the chair 70, and the entire assembly supporting the display 12 or panel 12.

In certain alternative embodiments, an apparatus in accordance with the invention may include a display that is electronic, or a combination of electronic and a print medium such as painting, ink, paper, transfer, heat, or the like. For example, a display with interlockable display modules is disclosed in U.S. Patent Publication US20050093768, filed by John A. Devos Oct. 31, 2003 and published May 5, 2005. A held computer device having a display is disclosed in U.S. Pat. No. 6,330,540 issued Dec. 11, 2001 to Louis Dischler. It uses battery or solar power on a display for a hand-held device.

Also by way of examples, U.S. Patent Publication US20060243328, filed Apr. 28, 2005 by Raymond L. Bessmertny was published Nov. 2, 2006 and includes an LCD display relying on solar power, which may be stored for powering backlighting for nighttime viewing. Also, various meter displays rely on power collected for use in isolated or remote stations, such as that disclosed in U.S. Pat. No. 8,662,279 issued Mar. 4, 2014 to Gavin Jones. Similarly, U.S. Pat. No. 6,308,890, issued Oct. 30, 2001 to J. Carl Cooper discloses use of a display of electro optical type such as LCD, LED, CRT powered by a solar cell.

In other art, methods and apparatus for a hazard warning system are disclosed in U.S. Patent Publication No. US20070052533, filed Aug. 24, 2005 by Victoria Glazer and published Mar. 8, 2007, including an LCD screen, network connection, and solar cell power. An apparatus for accessing electronic data is found in U.S. Patent Publication No. US20010013544, filed Dec. 22, 2000 by Spencer A. Rathus and published Aug. 16, 2001, disclosing a solar cell for powering a controller with an LED display, passive LCD, or active matrix LCD display communicating to a user. Even a passenger keyboard and display are disclosed in U.S. Patent Publication No. US20060075934, filed Sep. 28, 2005 by Pranil Ram and published Apr. 13, 2006, including a display screen, which may be a touch-sensitive screen and have LEDs and LCD types of displays.

All the foregoing references are hereby incorporated herein by reference. Any of the technologies identified therein may be incorporated into a display in accordance with the invention to support one or more mechanisms for selection and display of information in the system 10. These may include one or more of remote broadcast of information, storage of information, remote control of selection and display of information, user interactivity to control selection and display of information, remote powering by solar or other mechanisms, and so forth.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
   a lift chair comprising a seat and capable of suspending from a movable line of a lift system;
   a safety bar selectively positionable between a safe position, in front of the lift chair and an unsafe position thereabove;
   a display assembly comprising a panel, a spine connected to stiffen the panel by increasing the section modulus thereof, and a securement to secure the display assembly to the safety bar; and
   the display assembly, wherein the panel is formed to have a top surface presenting an image containing information on a planar surface to be viewable and discernible from the seat when the safety bar is in the safe position.

2. The apparatus of claim 1, wherein the information comprises data characterizing an environment in proximity to the lift chair.

3. The apparatus of claim 1, wherein the panel moves in rigid body relation with the safety bar.

4. The apparatus of claim 1, wherein the securement comprises a clamp selectively engaging with and removing from the safety bar.

5. The apparatus of claim 4, wherein the panel is configured to stack flat after removal of the clamps from the display assembly.

6. The apparatus of claim 1, further comprising:
   a plurality of seats provided with a single safety bar operable in association therewith; and a plurality of the display assemblies, each of the display assemblies corresponding to an individual seat of the plurality of seats.

7. The apparatus of claim 1, wherein the display assemblies are shaped to be stably self supporting when stacked.

8. The apparatus of claim 7, wherein adjacent display assemblies are shaped to fit in pairs aligned parallel to one another with adjacent top surfaces alternating between facing and reverse to one another.

9. The apparatus of claim 1, wherein the information is visible in at least one of the top surface and a bottom surface, opposite the top surface, through the panel as a transparent medium.

10. The apparatus of claim 1, wherein the image further comprises at least one of a heat transfer, printing, and a bonded material fixed to the panel.

11. The apparatus of claim 1, wherein the information comprises geographical information corresponding to the location of the lift chair.

12. The apparatus of claim 1 wherein the display assembly further comprises an adjuster to adjust orientation thereof with respect to the safety bar.

13. The apparatus of claim 12, wherein the adjuster is effective to selectively hold, release, rotate, and fix the display assembly with respect to the safety bar.

14. An apparatus comprising:
a safety bar capable of securement to a lift chair, comprising a seat and operating as part of a lift system, the safety bar shaped to extend across in front of the seat;
the safety bar, being selectively positionable between a safe position with the safety bar extending across in front of the lift chair, and an unsafe position elsewhere;
a display assembly comprising a panel having a top surface limiting directions of reflection of light therefrom to a finite number, a spine increasing a section modulus of the display assembly, and a securement; and
an image, secured to the panel and presenting the information.

15. The apparatus of claim 14, wherein the information is visible and discernible from the seat during operation of the lift system.

16. The apparatus of claim 14, wherein the safety bar is provided with a pivot above the seat about which the safety bar pivots between the safe position and the unsafe position, above the safe position.

17. The apparatus of claim 16, wherein the panel is positionable to be visible and discernible from the lift chair by moving the safety bar from the unsafe position to the safe position.

18. The apparatus of claim 14, wherein the display panel further comprises regions segregated according to the nature of a portion of the information presented thereon, including an information region presenting geographical information corresponding to the location of the lift chair and a commercial region presenting advertising information corresponding to a sponsor thereof.

19. The apparatus of claim 14, wherein the image presents at least one of geographical information corresponding to the lift chair, commercial information presenting advertising, and emergency information.

20. A method comprising:
providing information corresponding to a ski area;
selecting a lift chair having a seat portion and a back portion to support a rider;
selecting a safety bar cooperatively arranged with the lift chair to position selectively between a safe position opposite the back portion in front of the seat portion, and an unsafe position thereabove;
providing a display assembly comprising a panel portion, a spine stiffening the panel, and an image fixed to the panel to be viewable in at least one position of on and under the panel portion;
the providing the display, comprising selecting the panel portion to limit directions of light reflected thereon to a finite number;
the providing the display, comprising orienting the panel portion with respect to the safety bar to render the information in the image viewable from a rider position when the safety bar is in the safe position, wherein the panel portion is planar.

* * * * *